United States Patent [19]
Yoshigai, Kiyokazu

[11] 3,776,061
[45] Dec. 4, 1973

[54] BRAKE APPARATUS FOR BICYCLE
[75] Inventor: Yoshigai, Kiyokazu, Osaka, Japan
[73] Assignee: Yoshigai Kikai Kinzoku Co., Ltd., Osaka, Japan
[22] Filed: Nov. 15, 1972
[21] Appl. No.: 306,906

[30] Foreign Application Priority Data
June 14, 1972    Japan.............................. 47/71138

[52] U.S. Cl. ................................ 74/480 R, 74/489
[51] Int. Cl. .......................... B62k 23/06, B62l 3/02
[58] Field of Search .......................... 74/480 R, 489

[56]           References Cited
            UNITED STATES PATENTS
3,403,577   10/1968   Ozaki .............................. 74/489 X
3,596,530    8/1971   Yoshigai ......................... 74/489 X Primary Examiner—Allan D. Herrmann
Attorney—James E. Armstrong et al.

[57]           ABSTRACT

A brake apparatus for bicycle having a drop handle including a straight bar portion and bent bar portions to be mounted on the bent bar portion. The apparatus comprises a clip band for embracing the bent bar portion, a mounting bracket having an opening, a brake lever having a head inserted into the bracket from the opening and connected to one end of an actuating wire, and an auxiliary lever mounted on the inner side wall of the bracket and having portions extending in an L-form in parallel to the bent bar portion and straight bar portion respectively, with a coupling piece formed in the head of the auxiliary lever.

Also disclosed are technique for pivotally supporting and assembling the bracket, brake lever and auxiliary lever by a lever pin and a fastening screw and a device for retaining the fastening screw in the lever pin against loosening.

2 Claims, 8 Drawing Figures

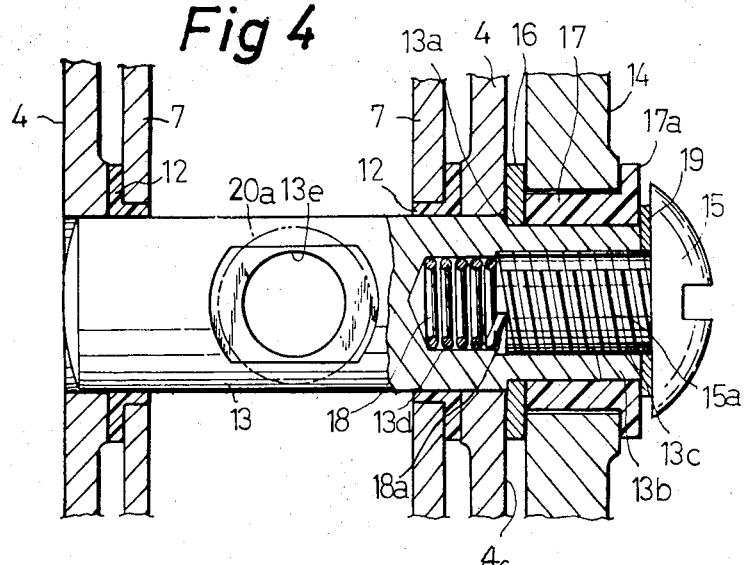
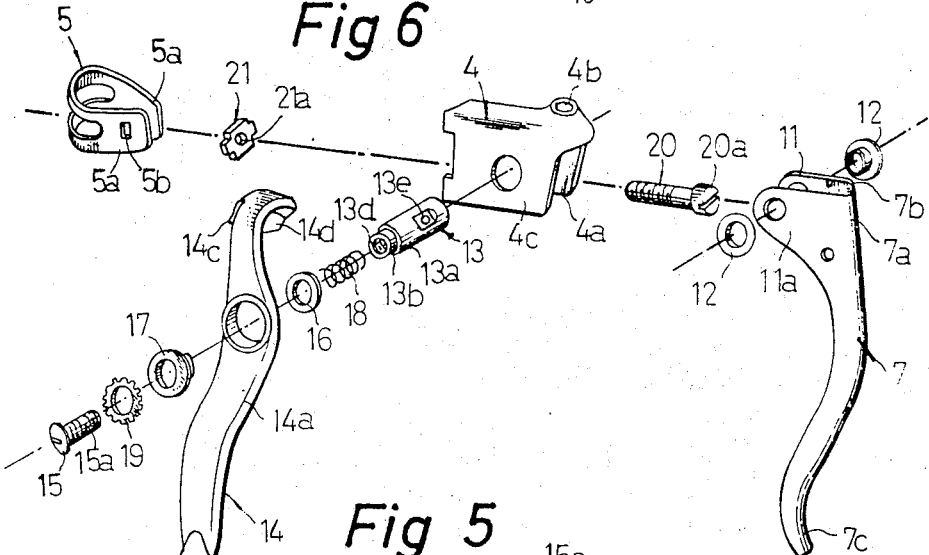
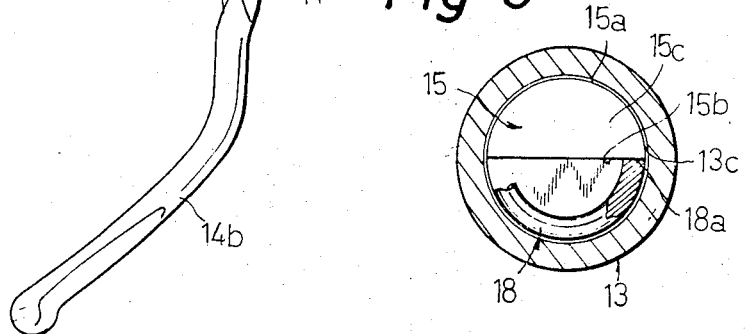

BRAKE APPARATUS FOR BICYCLE

BACKGROUND OF THE INVENTION

The present invention relates to a brake for bicycles, more particularly to a brake apparatus for bicycles of the drop handle type.

It is known that steering handles of bicycles are generally grouped into three types, i.e., up handle, flat handle and drop handle. Among these, the drop handle is used for racing bicycles which are adapted for high speed cycling as in track racing and road racing as well as for touring bicycles for cycling a long distance. The drop handle assures stable and efficient cycling free of fatigue because of its functional form which enables the rider to grasp the handle at a selected position and in an optimum posture suitably determined depending upon cycling purposes and cycling conditions such as a speed change from low to high or going up a slope.

The drop handle comprises an approximately horizontal straight bar portion mounted on a fork stem of the front wheel and extending substantially at right angles to the fork stem and bent bar portions projecting forward from the opposite ends of the straight bar portion and bent in a U-like shape.

As well-known, the brake lever is mounted approximately at the middle of the bent bar portion or at a slightly upper part thereof by means of a bracket. In the case where the brake lever is mounted at such specific position, the hand grasping the handle at the desired portion thereof in accordance with cycling purposes and conditions peculiar to the drop handle may possibly be inaccessible to the brake lever depending upon where the hands are positioned on the handle. Accordingly, when there arises a need to apply the brake, the hand has to be removed from the handle to operate the brake lever or the hand on the handle has to be shifted to operate the brake lever. Thus the rider must operate the brake in an unstable posture and, in an emergency, fails to apply the brake with appropriate timing with the possibility of the bicycle falling or colliding with another bicycle.

A brake apparatus for bicycles of the drop handle type has been proposed as disclosed in U.S. Pat. No. 3403577 (granted to the present applicant) which includes an auxiliary lever operatively associated with the brake lever on the drop handle so as to make it sure all the time that the brake lever can be operated by the hand which is grasping the drop handle at the desired portion thereof. This type of apparatus has so far won popularity.

More specifically, the improved brake apparatus principally comprises a clip band for securing the apparatus to the handle, a bracket, a brake lever, and an auxiliary lever. The bracket is in the form of a box having an opening from which the opposite side walls of the brake lever head are inserted. The auxiliary lever, approximately L-shaped, is attached to one side wall of the bracket. The bracket and the levers are supported on a lever pin extending therethrough and mounted in place by means of a bush, a fastening screw and a lock member, whereby the brake lever and auxiliary lever are pivotably supported on the lever pin. The auxiliary lever is formed at its front end with a coupling piece which is interposed between the engageable head of the brake lever and the guiding cylindrical portion of the bracket. The rear end of the auxiliary lever is bent at its midportion to provide a part positioned in parallel with the straight bar portion.

Thus, when the brake is to be applied by the hand grasping the straight bar portion of the handle, the fingers can be placed on that portion of the auxiliary lever which is parallel to the straight bar portion of the handle. It is therefore possible to operate the brake lever by moving that portion and thereby turning the coupling piece forward about the lever pin (lock member).

However, the improved brake apparatus is complex in its construction for supporting the three members, and the fastening screw and the lock member exposed from the opposite side walls of the bracket deteriorate its commercial value. Further in the case where the handle is grasped in accordance with cycling conditions and purposes, for example when travelling at a speed higher than 30 km/h or when going up a steep slope, the bracket portion has to be grasped with the handle brought closer toward the breast of the rider so that he may forcibly push down the pedal. On such occasion, the lock member projecting from the outer side wall of the bracket will contact the palm and cause a pain, hence the hand can not grasp the bracket firmly.

For these reasons, another construction has been commercially provided for supporting the abovementioned three members which no longer incorporates an externally projecting lock member as shown in FIG. 8.

According to this construction, the lever pin 13' extends through an auxiliary lever 14', a bracket 4' and a brake lever 7'. The lever pin 13' is formed with a transverse hole 13e' for passing and securing screw for forcing up a clip band 5'. The auxiliary lever 14' is fitted with a pair of flanged nylon bushes 17'. The lever pin 13' has a blind bore 13d' formed with a female screw-thread in which a coil spring 18' is placed. A fastening screw 15' is screwed into the blind bore 13d' with a spring washer 19' disposed between the lever pin 13' and the head of the screw 15'. The securing screw 20 is passed through the hole 13e' and screwed through a seat plate 21' provided on the clip band 5', to force up the band 5' and secure the brake apparatus to the drop handle.

With this support construction, the auxiliary lever 14', when operated, may possibly be urged in the direction of arrow P' shown, causing the bracket 4' to be pushed leftward in the drawing by the flange of nylon bush 17' which is in direct contact with one wall 4c' of the bracket 4'. This will produce a great clearance between the bracket 4' and the nylon bush 17', permitting the coupling piece on the head of auxiliary lever 14' to be disengaged from the head of brake lever 7'. Further the head 20a' of the screw 20' forcing up the clip band 5' will be inclined to contact one side wall 11a' of the brake lever because the securing screw 20' extends loosely through the hole 13e', preventing smooth pivotal movement of the brake lever 7' to render the brake substantially inoperative. Thus the construction is not suitable for a modern brake apparatus which must assure high safety.

SUMMARY OF THE INVENTION

A main object of this invention is to provide a brake apparatus including ingenuous means for supporting a bracket, a brake lever and an auxiliary lever so as to always assure proper brake lever operation which is essential to the brake apparatus and to permit the auxiliary lever to be operated properly all the time for a braking action whatever part of the handle may be grasped by the hand, the apparatus thus affording high safety in cycling.

Another object of this invention is to provide a brake apparatus wherein the construction for supporting the three members by a lever pin, bush and the like includes means by which a fastening screw screwed into the layer pin from one side thereof can be prevented from loosening due to vibration during travelling on a bad road or due to a long period of use, so as to secure safety in cycling.

Other objects and advantages of this invention will become more apparent from the following description of an embodiment thereof with reference to the accompanying drawings.

BRIEF DESCRIPTION OF THE DRAWING

FIG. 4 is an enlarged sectional view particularly showing a pivotally supporting construction;

FIG. 5 is a cross sectional view showing a locking spring and a fastening screw in arresting engagement;

FIG. 6 is an exploded perspective view showing constituent parts of the brake apparatus of this invention;

DESCRIPTION OF THE PREFERRED EMBODIMENT

Figure 1:
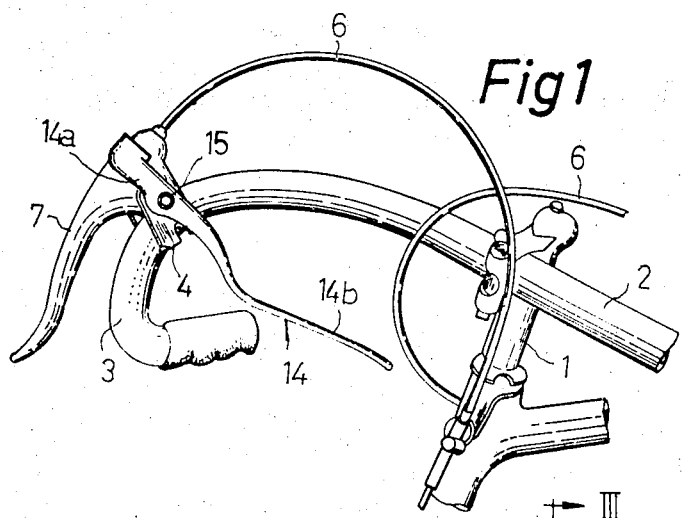
FIG. 1 is a perspective view of a brake apparatus of this invention mounted on a drop handle at its right portion.
Figure 2:
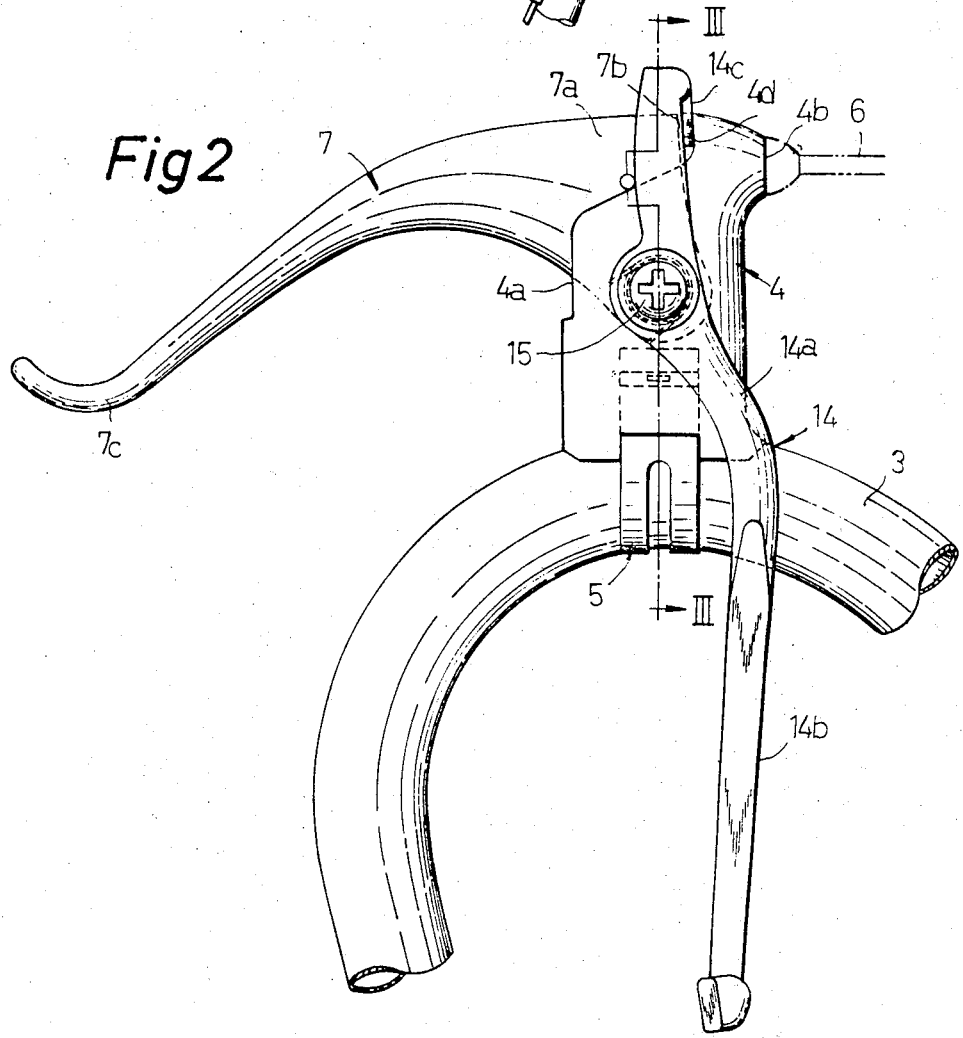
FIG. 2 is a side elevation of the same.
Figure 3:
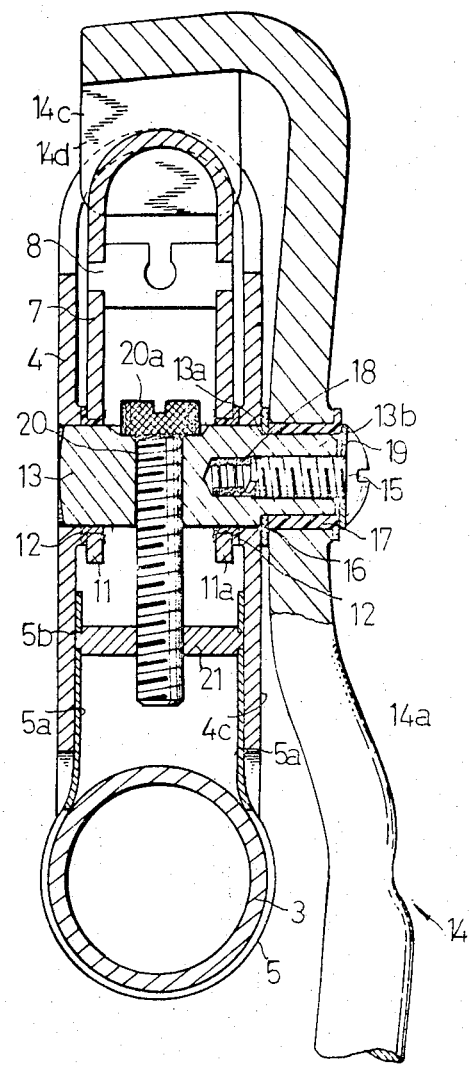
FIG. 3 is an enlarged sectional view of the same along the line III—III in FIG. 2.

Referring to the drawings, particularly to FIGS. 1 to 3, a drop handle mounted on a fork stem 1 comprises a straight bar portion 2 positioned substantially horizontally at right angles to the fork stem 1 and bent bar portions 3 respectively extending forward from the opposite ends of the straight bar portion 2 substantially in U-form.

The present braking apparatus is mounted on the bent portion 3 approximately at its midportion by means of a bracket 4 and a clip band 5. The bracket 4 is in the form of a box having a front opening 4a and a hole 4b in its rear top portion for passing a brake wire 6.

A brake lever 7 is provided in its head 7a with a connector 8 to which one end of an unillustrated inner wire included in the brake wire 6 is secured. Opposite side walls 11 and 11a of the head 7a are inserted into the bracket 4 through the opening 4a and supported on a lever pin 13 by means of flanged nylon bushes 12 and 12.

An auxiliary lever 14 has a portion 14a parallel to the bent portion 3 and a portion 14b parallel to the straight bar portion 2 of the handle which are substantially L-shaped. An intermediate part of the portion 14a is pivoted by a fastening screw 15 to one side wall 4c of the bracket 4. A coupling piece 14c extending from the pivoted portion has an engaging wall 14d interposed between the end face 7b of head of the brake lever 7 and the end face 4d of opening of the bracket 4.

As will be apparent from the above description, the bracket 4, brake lever 7 and auxiliary lever 14 are supported on the lever pin 13 and retained in position by the fastening screw 15. The lever pin 13 has such length as to extend through the above-mentioned three members. As shown in FIG. 6, one end of the lever pin 13 has a stepped portion 13a to provide a reduced diameter portion 13b, which is formed with a blind bore 13d formed with a female screw-thread 13c extending from the end of the reduced diameter portion 13b to an intermediate part. A metal washer 16 and a flanged bush 17 made of a rigid resin such as nylon are fitted around the reduced diameter portion 13b. A coil spring 18 is placed in the blind bore 13d, and the fastening screw 15 is driven therein with a spring washer 19 positioned on the end face of the reduced diameter portion. In this way, the brake lever 7 and auxiliary lever 14 are pivotally supported on the lever pin 13.

Since the auxiliary lever 14 is pivotally supported on the reduced diameter portion 13b with the rigid resin bush 17 interposed therebetween, the lever 14 can be pivotally moved with minium wear and damage. The use of the washer 16 made of metal is advantageous, because it is less susceptible to deformation for the reason to be described later, when brought into engagement with the stepped portion 13a.

Figure 7:
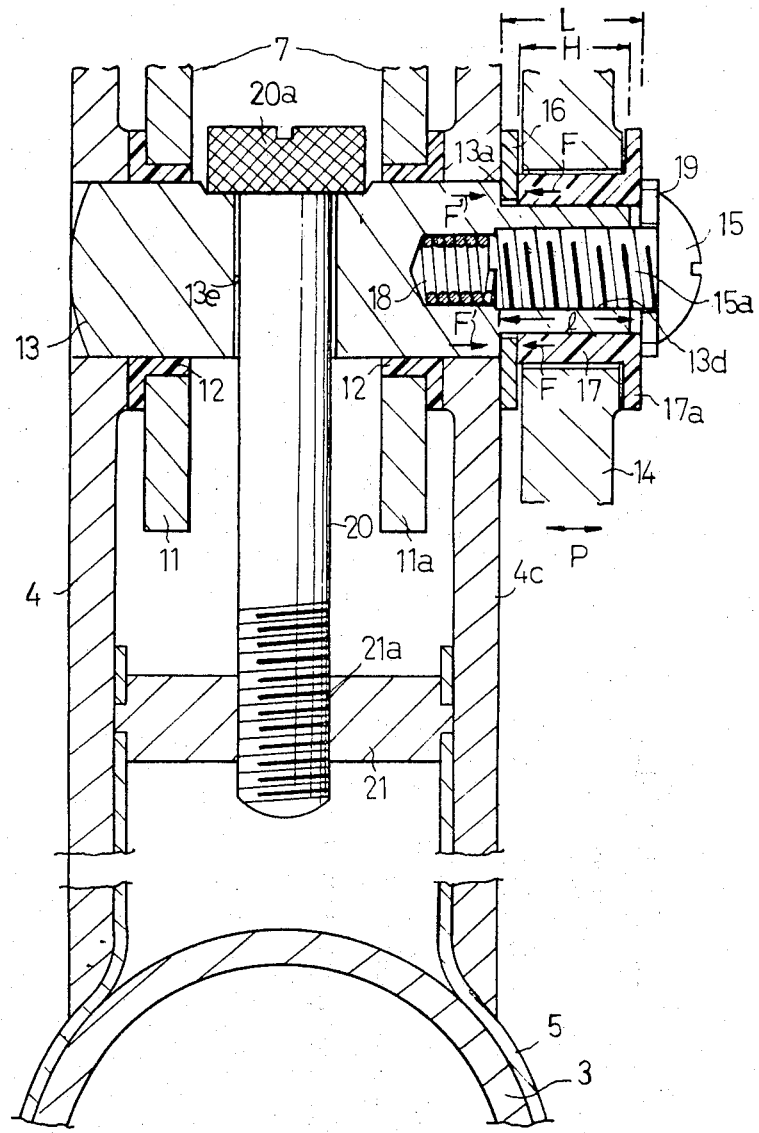
FIG. 7 is a sectional view of the support construction shown in FIG. 4, the view illustrating the auxiliary lever portion on an enlarged scale.
Figure 8:
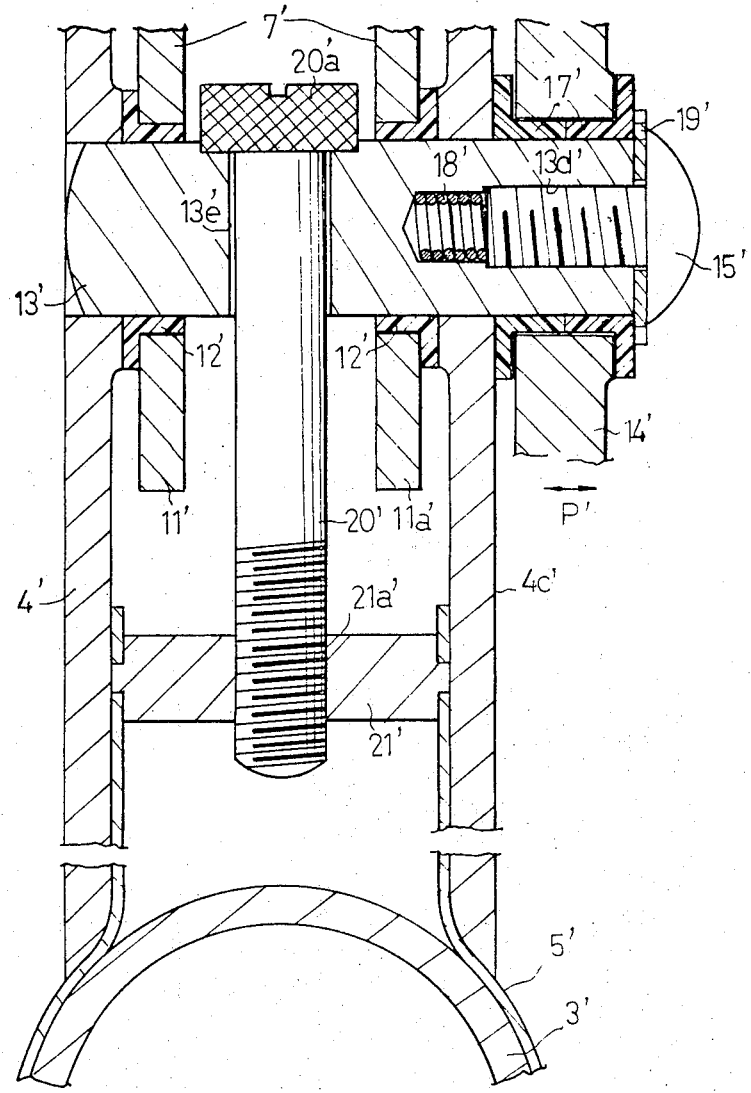
FIG. 8 is a sectional view showing a conventional corresponding to FIG. 4.

As seen in FIG. 7, the length l of the reduced diameter portion 13b is smaller than the total length L, i.e., the thickness of the metal bush 16 plus the length of the bush 17.

The lever pin 13 is formed, substantially at its midportion, with a hole 13e extending transversely through the pin 13 for passing a securing screw 20 for forcing up the clip band 5. The hole 13e has such diameter that the securing screw 20 can pass therethrough loosely.

The clip band 5 is provided with a seat plate 21 retained thereon through engagement with openings 5b and 5b formed in its opposite wall ends 5a and 5a. The seat plate 21 has a threaded hole 21a in which the securing screw 20 is screwed in.

The head 7a of the brake lever 7 is inserted into the bracket 4 through its opening 4a, with the opposite side walls 11 fitted to the side walls 4c of the bracket 4. The lever pin 13 is then inserted into the bracket 4 and the head 7a from one side. The clip band 5 is fitted around the handle bent portion 3 approximately at its midportion. The opposite side walls 5a and 5a of the clip band 5 are fitted onto the inner faces of opposite side walls 4c, 4c of the bracket 4. The securing screw 20 is passed through the hole 13e of the pin 13 and screwed into the threaded hole 21a of the seat plate 21. The clip hand 5 thereby forced upward now firmly embraces the bent portion 3 of the handle, whereby the assembly is held in position as seen in FIG. 3.

The coil spring 18 is then placed into the blind bore 13d of the lever pin 13 and the washer 16 is fitted around the reduced diameter portion 13b of the lever pin 13. The auxiliary lever 14 with a bush 17 fitted therein is mounted on the pin 13, and the fastening screw 15 is screwed into the blind bore 13d with the spring washer 19 interposed between the bush and the screw head.

Since the combined length L of the washer 16 and bush 17 is greater than the axial length l of the reduced diameter portion 13b, the pressing force F exterted by the fastening screw 15 driven in acts on the bush 17 through the spring washer 19 as shown in FIG. 7 and further on the washer 16 by way of the bush 17.

Because the lever pin 13 is formed with a stepped portion 13a, the pressing force F acting on the washer 16 is exerted on the stepped portion 13a, which is subjected to a counteracting force F' produced in the opposite direction when the fastening screw 15 is driven in, with the result that the washer 16 is firmly clamped between the stepped portion 13a and the bush 17. Thus when the fastening screw 15 is driven in to the greatest extent, the stepped portion 13a will be flush with the outer face of one side wall 4c of the bracket 4 as seen in FIG. 4.

For this reason, the auxiliary lever 14 is pivotably supported with the distance H between the washer 16 and the flange 17a of the bush 17 kept constant all the time as illustrated in FIG. 7.

Thus when a lateral external force is exerted as shown by an arrow P in FIG. 7 by the auxiliary lever 14 when it is operated, the bracket 4 is free of the resulting pressure because the washer 16 is held against the stepped portion 13a, without any relative lateral displacement of the lever pin 13. Accordingly, the distance H is kept constant and shake of the auxiliary lever 14 is precluded.

Further the securing screw 20 extending through the lever pin 13 and screwed into the seat plate 21 retains the pin 13 in position, while the washer 16 held against the stepped portion 13a keeps the bracket 4 free from the pressure to be otherwise exerted by the external force as described above. Consequently, the brake lever 7 will not slide on the lever pin 13, assuring that one side wall 11a of the brake lever 7 will be free of contact with the head 20a of the securing screw 20, permitting accurate and smooth pivotal movement of the brake lever 7 all the time to achieve safety during cycling.

According to this invention, it is assured that the fastening screw 15 will be held in engagement with the lever pin 13 against loostening by the construction shown in FIGS. 4 and 5 in which the winding direction of the coil spring 18 placed in the blind bore 13d is opposite to the direction in which the male screw-thread 15a of the fastening screw extends (i.e., if the former is left-handed, the latter is right-handed), the fastening screw 15 being formed, at its end, with a cutout stepped portion 15b for retaining one end 18a of the coil spring 18.

When the fastening screw 15 is driven into the blind bore 13d with the coil spring 18 placed therein, the coil sping 18 will be compressed by the fastening screw 15. At this time, since the hand of coil spring 18 is opposite to that of the screw, the stepped portion 15b will not arrest one end 18a of the coil spring 18 but moves past the same, permitting the end face 15c of the screw 15 to compress the spring 18 in sliding contact with part of the end 18a. If the spring 18 and the screw 15 were handed in the same direction, the stepped portion 15b would strike against one end 18a of the spring to untwist the spring 18 as the fastening screw is driven in, with the result that the fastening screw 15 would be prevented from further inward movement. The present construction is free of such problem.

After the fastening screw 15 has been screwed to its final position, the restoring force of the compressed spring 18 acts in the axital direction of the fastening screw 15, with one end 18a of the spring in engagement with the stepped portion 15b as seen in FIG. 5, so that not only the restoring force of the spring 18 but also the engagement between the end 18a and the stepped portion 15b prevent loosening of the fastening screw 15 from the lever pin 13, even when it is subjected to marked vibration while the bicycle is driven on a bad road, eliminating shake of the auxiliary lever 14 and the resulting inaccurate braking operation.

According to this invention, the brake lever 7 mounted on the bent bar portion 3 of the drop handle by means of bracket 4 can be pivotally moved about the lever pin 13 by turning the tail end 7c of the lever 7 in a counter-clockwise direction in FIGS. 1 and 2 as in usual manner, whereby the brake wire 6 connected at its one end to the connector 8 is pulled through the guide opening 4a of the bracket 4 to press brake shoes against the rim for a braking action. Thus if the drop handle is grasped by the hand at such position that its fingers are engageable with the lever 7, the lever 7 per se is operated to actuate the brake as in the conventional device.

In the case where the hand gripping the handle is not accessible to the brake lever 7 as when the straight bar portion 2 of the handle is grasped or the bent bar portion is gripped in proximity with the straight bar portion 2 away from the bracket 4, the auxiliary lever 14 will be operated to actuate the lever 7.

Since the auxiliary lever 14 includes portions 14a and 14b formed in L-form and positioned substantially in parallel with the bent bar portions 3 and straight bar portion 2 respectively, the fingers of the hand grasping the handle can be placed directly on the portion 14a or 14b to pivotally move the auxiliary lever 14 about the lever pin 13, causing its coupling piece 14c to push the head 7a of the lever 7. Through this movement, the lever 7 is pivotally moved about the lever pin 13 as when the tail end 7c is operated. The brake shoes can be actuated through the wire 6 therefore. Conventionally, the hand grasping the handle, if inaccessible to the lever 7, has to be slidingly moved toward the lever 7 to manipulate the same or the hand has to be removed from the handle to operate the lever 7. The provision of the portions 14a and 14b and that symmetrically on either side of the handle has eliminated such instability or possible danger, no matter what part of the handle may be grasped, making it possible to operate the lever 7 accurately and quickly without losing the braking timing by utilizing the auxiliary lever 14 to assure safety.

Various advantages are assured by the construction for povotally supporting the bracket 4, brake lever 7 and auxiliary lever 14 which comprises the lever pin 13 extending through these members and having the stepped portion 13a, the lever pin 13 carrying thereon washer 16 in fitting engagement with the stepped portion 13a and nylon bush 17 positioned externally of the washer 16, with the fastening screw 15 screwed in the blind bore 13d of the lever pin 13. For instance, the bracket 4 has an improved commercial value because it does not have a screw head projecting therefrom which heretofore caused a pain in the palm if the bracket was grasped. Further when the fastening screw 15 is driven in, the resulting pressure will not act directly on the side wall 4c of the bracket 4 but on the stepped portion 13a, with the result that the distance between the washer 16 and the flange 17a of the bush 17 can be kept constant all the time. Even if moved transversely, the auxiliary lever 14 will exert an external force on the stepped portion 13a by way of the washer 16, without pressing the bracket 4 on the lever pin 13. Consequently, it is assured that the head 20a of the securing screw 20 will not contact the side wall of the brake lever 7, permitting the brake lever 7 to rotate smoothly all the time. The constant distance always maintained between the washer 16 and the flange 17a of the brake bush 17 serves to eliminate shake of the auxiliary lever 14 and prevent the disengagement of the coupling piece 14c from the head 7a of the brake lever for safety cycling and accurate braking action.

Loostening of the fastening screw 15 is prevented by the restoring force of the coil spring 18 placed in the blind bore 13d of the lever pin 13 as well as by the arresting engagement between one end 18a of the coil spring 18 with the stepped portion 15b. The pivotable members are thus supported reliably all the time even if subjected to vibration or the like. The coil spring 18 winding in a direction opposite to the hand of helical thread of the fastening screw 15 enables the fastening screw 15 to be screwed into the blind bore 13d free of trouble.

What is claimed is:

1. A brake apparatus for a bicycle having a drop handle including a straight bar portion and bent bar portions to be mounted on the bent bar portion comprising a clip band for embracing the bent bar portion having a seat plate, a mounting bracket having an opening, a brake lever having a head inserted into the bracket from the opening and connected to one end of an actuating wire, and an auxiliary lever mounted on the inner side wall of the bracket and having portions extending in an L-form in parallel with the bent bar portion and the straight bar portion respectively, the auxiliary lever having a coupling piece formed in its head, the bracket, the brake lever and the auxiliary lever being supported on a lever pin extending therethrough, the lever pin being formed at its intermediate portion with a hole transversely of the lever pin for passing a screw and having a stepped portion to deifine a reduced diameter portion at its end, the reduced diameter portion being provided with a blind bore formed with a female screw-thread and extending in its axial direction, a metal washer and a flanged rigid resin bush being fitted on the reduced diameter portion with the auxiliary lever pivotally supported between the metal washer and the flange of the rigid resin bush, a fastening screw being screwed in the blind bore such that the pressure of the screwed-in fastening screw acts on the metal washer to engage the metal washer with the stepped portion and thereby retain the washer and the flange of the bush in constant relation.

2. The brake apparatus for a bicycle as set forth in claim 1 wherein the blind bore has received therein a coil spring whose winding extends in direction opposite to the hand of male screw-thread of the fastening screw and the fastening screw is formed in its distal end with an arresting stepped portion so as to permit the screwed-in fastening screw to compress the spring, which in turn exerts its restoring force on the arresting stepped portion with one end of the spring in engagement with the arresting stepped portion to prevent loosening of the fastening screw.

* * * * *